United States Patent [19]
Sydansk

[11] Patent Number: 5,834,406
[45] Date of Patent: Nov. 10, 1998

[54] FOAMED GEL FOR PERMEABILITY REDUCTION OR MOBILITY CONTROL IN A SUBTERRANEAN HYDROCARBON-BEARING FORMATION

[75] Inventor: Robert D. Sydansk, Littleton, Colo.

[73] Assignee: Marathon Oil Company, Findlay, Ohio

[21] Appl. No.: 612,637

[22] Filed: Mar. 8, 1996

[51] Int. Cl.$^6$ ............................................. E21B 33/138
[52] U.S. Cl. ..................... 507/202; 507/230; 507/903; 166/295; 166/300; 166/309
[58] Field of Search .................................. 166/295, 300, 166/309; 507/202, 225, 903, 230

[56] References Cited

U.S. PATENT DOCUMENTS

| | | | |
|---|---|---|---|
| 3,402,137 | 9/1968 | Fischer et al. | 524/321 |
| 3,530,940 | 9/1970 | Dauben et al. | 166/305.1 |
| 3,630,286 | 12/1971 | Persinski | 166/309 |
| 4,068,719 | 1/1978 | Clampitt et al. | 166/282 |
| 4,300,634 | 11/1981 | Clampitt | 166/272.4 |
| 4,389,320 | 6/1983 | Clampitt | 507/207 |
| 4,665,986 | 5/1987 | Sandiford | 166/288 |
| 4,683,949 | 8/1987 | Sydansk et al. | 166/270 |
| 4,694,906 | 9/1987 | Hutchins et al. | 166/294 |
| 4,730,675 | 3/1988 | Wygant et al. | 166/300 |
| 4,779,680 | 10/1988 | Sydansk | 166/300 |
| 4,796,700 | 1/1989 | Sandiford et al. | 166/300 |
| 4,871,021 | 10/1989 | Shu | 166/295 |
| 5,105,884 | 4/1992 | Sydansk | 166/295 |
| 5,129,457 | 7/1992 | Sydansk | 166/274 |
| 5,203,834 | 4/1993 | Hutchins et al. | 166/295 |
| 5,322,125 | 6/1994 | Sydansk | 166/295 |

OTHER PUBLICATIONS

Sydansk, R.D., "A New Conformance–Improved–Treatment Chromium(III) Gel Technology", *SPE/DOE 17329 Enhanced Oil Recovery Symposium: Society of Petroleum Engineers,* Apr. 20, 1988, Tulsa, OK.

Sydansk, R.D., "Field Testing of a New Conformance–Improvement–Treatment Chromium(III) Gel Technology", *SPE/DOE 17383 Enhanced Oil Recovery Symposium: Society of Petroleum Engineers,* Apr. 20, 1988, Tulsa, OK.

*Primary Examiner*—Richard D. Lovering
*Assistant Examiner*—Daniel S. Metzmaier
*Attorney, Agent, or Firm*—Jack L. Hummel; Jack E. Ebel

[57] ABSTRACT

A process employing a foamed gel in a subterranean hydrocarbon-bearing formation to reduce the permeability of a treatment region therein or control the mobility of a drive fluid in the formation. The foamed gel is formed from a crosslinkable carboxylate-containing polymer, a crosslinking agent containing a reactive transition metal cation, a polyvinyl alcohol, an aqueous solvent, and an added gas.

24 Claims, No Drawings

FOAMED GEL FOR PERMEABILITY REDUCTION OR MOBILITY CONTROL IN A SUBTERRANEAN HYDROCARBON-BEARING FORMATION

BACKGROUND OF THE INVENTION

1. Technical Field

The present invention relates to a process for permeability reduction or mobility control in a subterranean hydrocarbon-bearing formation and more particularly to such a process, wherein a foamed gel is employed as a permeability-reducing or mobility-controlling composition.

2. Description of Related Art

Foamed gels are known to have a number of oilfield applications. For example, U.S. Pat. No. 5,322,125 to Sydansk teaches a process employing a foamed gel as a permeability-reducing agent to reduce gas coning in a matrix environment of a subterranean hydrocarbon-bearing formation. The foamed gel of U.S. Pat. No. 5,322,125 comprises a crosslinked polymer gel, a foaming gas and a surfactant to induce foam formation. U.S. Pat. Nos. 4,300,634 and 4,389,320 both to Clampitt also teach the use of a foamed gel as a permeability-reducing agent in a subterranean hydrocarbon-bearing formation. Despite the prior art knowledge of foamed gels having utility in oilfield applications, a need remains for oilfield applications employing alternate foamed gels other than those known in the art that have satisfactory performance properties.

Accordingly, it is an object of the present invention to provide an alternate foamed gel that performs effectively in permeability reduction treatments. More particularly, it is an object of the present invention to provide a permeability-reducing composition that effectively reduces the permeability of a desired treatment region under a broad range of subterranean conditions. It is another object of the present invention to provide a foamed gel that effectively controls the mobility of a drive fluid during a hydrocarbon recovery operation. More particularly, it is an object of the present invention to provide a mobility-controlling composition that effectively reduces the mobility of a drive fluid under a broad range of subterranean conditions. It is still another object of the present invention to provide a permeability-reducing or mobility-controlling composition that is relatively stable under harsh formation conditions including the presence of high temperatures, crude oil, high salinity brines or high hardness brines. It is further an object of the present invention to provide such a permeability-reducing or mobility-controlling composition that is cost effective, having practical economic utility in the field.

SUMMARY OF THE INVENTION

The present invention is a process and composition for improving hydrocarbon recovery from a subterranean formation penetrated by a well bore. In a first embodiment, improved hydrocarbon recovery is achieved by employing the composition of the present invention to reduce the permeability of a subterranean formation, and in particular to reduce the permeability of a desired treatment region within the formation. In a second embodiment, improved hydrocarbon recovery is achieved by employing the composition of the present invention to control the mobility of an oil-recovery drive fluid within a subterranean formation, and in particular to reduce the mobility of the drive fluid within the formation. Although the process of the present invention is described in the context of two alternate embodiments for permeability reduction applications and mobility control applications, respectively, it is noted that the processes of the two embodiments can be practiced simultaneously within a given formation using the same composition to simultaneously achieve both permeability reduction and mobility control. Alternatively, the process of either embodiment can be practiced separately as a solo procedure within a given formation to achieve permeability reduction or mobility control, as desired.

The composition of the present invention is a foamed gel comprising a crosslinkable polymer, a crosslinking agent, a polyvinyl alcohol, an aqueous solvent, and an added gas. The crosslinkable polymer is a biopolymer or a synthetic polymer. A preferred crosslinkable polymer is a carboxylate-containing polymer having one or more carboxylate crosslinking sites. The crosslinking agent includes a reactive transition metal cation in the presence of one or more organic and/or inorganic anions. In particular, the crosslinking agent is a salt comprising the transition metal cation and one or more organic and/or inorganic anions, or a chemical complex, comprising the transition metal cation associated with one or more organic and/or inorganic ligands.

The crosslinking agent crosslinks the carboxylate-containing polymer and the polyvinyl alcohol uniformly disperses the added gas throughout the resulting crosslinked polymer network, thereby forming the desired foamed gel without unduly diminishing the structure, viscosity, strength or stability of the crosslinked polymer network. Consequently, the foamed gel displays permeability reduction or mobility control characteristics approaching those of corresponding conventional unfoamed gels at a substantially reduced chemical cost.

In accordance with the first embodiment, the composition of the present invention is a permeability-reducing composition having utility in one or more of the following subterranean treatments: conformance improvement, water shut-off, gas shut-off, water coning and gas coning. When utilized in a conformance improvement treatment, the permeability-reducing composition improves vertical and areal conformance within a subterranean formation and correspondingly improves flow profiles and sweep efficiencies of injected or produced fluids in the formation. In doing so, the composition enhances contact within the formation between injected fluids and produced hydrocarbon fluids, thereby desirably mobilizing the hydrocarbon fluids and facilitating their displacement from the formation. When utilized in a water shut-off or gas shut-off treatment, the permeability-reducing composition is preferably placed at or near a production well bore to block the flow of water or gas into the well bore. When utilized in a water coning or gas coning treatment, the permeability-reducing composition is likewise preferably placed at or near a production well bore to facilitate the flow of liquid hydrocarbons into the well bore.

The permeability-reducing composition can be placed and maintained in a treatment region of the formation in a flowing or non-flowing state. As such, the composition can be placed in the treatment region as a preventative treatment prior to the injection of fluids into or production of fluids from the formation. Alternatively, the composition can be placed in the treatment region after the injection of fluids therein or production of fluids therefrom as a remedial treatment. In any case, the composition exhibits a high degree of structure, strength and stability within the treatment region.

In accordance with the second embodiment, the composition of the present invention is a mobility-controlling composition that promotes improved sweep efficiency and incremental oil recovery of a gas or liquid drive fluid in a hydrocarbon-bearing formation. The mobility-controlling composition is placed in the formation in a flowing state in association with the drive fluid. The mobility-controlling composition exhibits a high degree of viscosity and stability within the formation in the presence of the drive fluid. The invention will be further understood, both as to its use and composition, from the accompanying description.

DESCRIPTION OF PREFERRED EMBODIMENTS

A number of specific terms are used throughout the specification to describe the process of the present invention and are defined as follows. A "formation" is a subterranean geological structure consisting essentially of "matrix," and in some instances, "anomalies." A "reservoir" is a hydrocarbon-bearing formation. An "anomaly" is a volume within a formation having a very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "wellbore" is defined as a bore hole extending from the earth surface to a reservoir. Thus, a wellbore is a conduit providing fluid communication between the surface and the formation penetrated thereby. The term "well" is synonymous with the term "wellbore." A "gel" or "gel medium" is a continuous three-dimensional chemically crosslinked polymeric network integrating a liquid into the interstices of the network. A "foamed gel" is a composition having a stabilized gas dispersion within a gel medium. The foamed gel structure is made up of gas bubbles separated from one another by lamellae of interfacially stabilized films of the gel medium. Other terms used herein have definitions in accordance with the conventional usage of a skilled artisan, unless otherwise defined hereafter.

The foamed gel utilized in the present invention comprises a crosslinkable polymer, a crosslinking agent, a polyvinyl alcohol, a liquid solvent, and an added gas. Many crosslinkable polymers, including synthetic polymers and biopolymers, are known in the art and have utility herein. A type of crosslinkable polymer having specific applicability to the present invention are carboxylate-containing polymers. Preferred among the carboxylate-containing polymers are acrylamide-containing polymers. Of the acrylamide-containing polymers, the more preferred are polyacrylamide (PA), partially hydrolyzed polyacrylamide (PHPA), as well as copolymers, terpolymers and tetrapolymers of acrylamide. Exemplary copolymers include copolymers of acrylamide and acrylate, and copolymers, terpolymers or tetrapolymers containing AMPS or vinylpyrrolidone. PA, as defined herein, has from about 0 mole % to about 1.0 mole % of its amide groups hydrolyzed. Although 0 mole % hydrolyzed PA initially lacks any carboxylate groups, it can undergo autohydrolysis under the conditions of the present process to generate carboxylate groups, thereby satisfying the definition of a carboxylate-containing polymer having utility within the scope of the present invention. PHPA has greater than about 1.0 mole %, but less than 100%, of its amide groups hydrolyzed to carboxylate groups. The average molecular weight of an acrylamide polymer having utility herein is generally in a range between about 10,000 and about 50,000,000, preferably between about 150,000 and about 20,000,000, and most preferably between about 200,000 and about 15,000,000.

The crosslinking agent of the present invention effectuates chemical crosslinking between appropriate sites of the same or two different polymer molecules, thereby creating the network structure of the gel medium. Crosslinking agents having utility herein are generally water-soluble compositions containing a reactive transition metal cation. Such compositions include organic or inorganic salts of the reactive transition metal cation. Preferred salts are inorganic salts of a trivalent chromium cation such as chromic trichloride, chromic tribromide, chromic nitrate, and chromic sulfate. Other such compositions include complexes containing the reactive transition metal cation associated with an organic carboxylate anion or an inorganic anion. The term "organic carboxylate anion" as used herein encompasses carboxylate anionic species including monocarboxylate anions, such as acetate, poly-carboxylate anions, such as malonate, and substituted derivatives of carboxylate anions, such as glycolate, lactate and citrate. The carboxylate anions are generally obtained from the corresponding acids or salts thereof. Preferred among such complexes are those including a trivalent chromium cation complexed with the carboxylate anion. An example of such a preferred complex is the trivalent chromium cation complexed with the acetate anion to form chromium triacetate as taught in U.S. Pat. No. 4,683,949 incorporated herein by reference. The chromium triacetate complex can be in the form of, or derived from, solid $CrAc_3$, solid $CrAc_3.H_2O$, solid $Cr_3Ac_7(OH)_2$ or a solution labeled "Chromic Acetate 50% Solution" that is commercially available, for example, from McGean-Rohco Chemical Co., Inc., 50 Public Square, No. 1250, Cleveland, Ohio 44113-2251, U.S.A. Other examples of complexes having utility herein include chromic triproprionate. Of the above-recited crosslinking agents, the most preferred are chromic trichloride and chromic triacetate.

Although less preferred, alternate crosslinking agents include salts and complexes of transition metal cations other than the trivalent chromium cation, such as salts or complexes of a trivalent aluminum cation (particularly in the form of aluminum citrate or aluminum trichloride), or of a trivalent iron cation. Yet another alternate crosslinking agent is a hexavalent chromium cation in a redox system.

The polyvinyl alcohol employed herein is preferably cold water soluble, i.e., soluble in water at a temperature less than about 30° C. The polyvinyl alcohol has an average molecular weight range between about 1000 and 500,000 and preferably between about 50,000 and 250,000. The polyvinyl alcohol is generally at least about 60 mole % hydrolyzed and preferably at least about 75 mole % hydrolyzed.

The aqueous solvent of the gelation solution is substantially any aqueous liquid capable of forming a gelation solution from the solvent, crosslinkable polymer, crosslinking agent and polyvinyl alcohol. The term "solution" as used herein, in addition to true solutions, is intended to broadly encompass dispersions, emulsions, or any other homogeneous mixture of the gelation solution components in the aqueous solvent. The solvent is preferably a fresh water, although a brine, such as sea water or produced water from a subterranean formation can also have utility herein. Produced water can be advantageous because of its low-cost availability and because it enables the practitioner to return the produced water to the formation, thereby avoiding more costly and less environmentally compatible methods of disposing the produced water.

The added gas may be substantially any gas that is substantially unreactive with the above-recited polymer, crosslinking agent, polyvinyl alcohol, and solvent components and that is capable of being dispersed throughout the liquid medium. Examples of added gasses having utility herein are air, nitrogen, methane, carbon dioxide, nitrous oxide, natural gas, steam, produced gas or flue gas. Nitrogen, natural gas, carbon dioxide or produced gas are preferably used in the production of the present foamed gels.

The foamed gel is preferably prepared by initially formulating a gelation solution at the surface that is a homogeneous fluid admixture of the solvent, polymer, crosslinking agent and polyvinyl alcohol. The polymer, crosslinking agent, and polyvinyl alcohol can each be provided in the form of a discrete aqueous solution. A biocide, such as formaldehyde, can also be added to the gelation solution to prevent the biological degradation of the polyvinyl alcohol or crosslinkable carboxylate-containing polymer in the resulting foamed gel when placed in the formation. Surface admixing to produce the gelation solution broadly encompasses batch mixing the components in bulk prior to injection into the wellbore or mixing the components in-line during injection into the wellbore. The crosslinkable carboxylate-containing polymer concentration of the gelation solution is generally at least about 500 ppm, preferably at least about 2,000 ppm, and most preferably within a range between about 3,000 ppm and about 100,000 ppm. The transition metal cation concentration of the gelation solution is generally between about 10 ppm and about 20,000 ppm, and preferably between about 20 ppm and about 4,000 ppm. The crosslinking agent is present in amounts such that the molar ratio of the carboxylate anions of the crosslinking agent to the transition metal cations of the gelation solution is preferably between about 0.5:1 and 100:1 and preferably between about 3:1 and 25:1. The polyvinyl alcohol concentration in the gelation solution is about 20 ppm to about 100,000 ppm, preferably about 50 ppm to about 20,000 ppm, and most preferably about 1,000 ppm to about 5,000 ppm. Typically the weight ratio of polymer to polyvinyl alcohol in the gelation solution is from about 0.5:1 to about 5:1.

Preparation of the foamed gel proceeds by appropriately contacting the added gas with the aqueous gelation solution in a manner that combines and mixes the added gas and gelation solution to form a foam. The added gas can be combined and mixed with the gelation solution by conventional foaming means such as sparging, high speed mixing, or simultaneously flowing the gas and gel composition through one or more orifices, such as a screen or a plate with one or more orifices, or through a solid packing, such as a sandpack or a gravel pack. The location and timing of the gas addition step can be any one of several alternatives, including at the surface prior to injection of the foamed gel into the wellbore, at the surface simultaneous with coinjection of the gelation solution into the wellbore or in situ. In any case, the polyvinyl alcohol is found to possess surfactant-like characteristics, thereby promoting foaming of the aqueous gelation solution.

The volumetric gas content of the foamed gel, termed foam quality, is expressed as the volume percent of gas in the foamed gel at a given temperature and pressure. Foamed gels having utility in the present process generally have a foam quality between about 20% and about 99%, preferably between about 50% and about 98%, and most preferably between about 70% and about 97%. The foam quality of the foamed gel is selected within the limits set forth above as a function of the specific application of the foamed gel. Foamed gel strength is often an inverse function of foam quality. Thus, if a high strength foamed gel is desired, the foamed gel is usually formulated with a relatively low foam quality. Conversely, if a lower strength, less costly, or lower density foamed gel is desired, the foamed gel is usually formulated with a higher foam quality. It is noted that high strength foamed gels have specific application as permeability-reducing compositions in formations exhibiting high permeability matrix or relatively large and/or highly conductive anomalies, such as large fracture networks.

Maturation of the foamed gel entails chemical crosslinking of the polymer and crosslinking agent within the gelation solution. For acrylamide polymers containing carboxylate groups, crosslinking, or gelation as it is alternatively termed, is normally initiated as soon as the polymer and crosslinking agent contact unless an optional delaying agent is included in the gelation solution. The delaying agent can delay the availability of the crosslinking agent or simply slow the rate of the crosslinking reaction. Delaying agents that may have utility in the gelation solution of the present invention are water-soluble acids and salts of carboxylate anions. The carboxylate anion of an acid or salt delaying agent can be the same species as the carboxylate anion of the crosslinking agent or can be a different species. Preferred delaying agents in the practice of the present invention are salts or acids of acetate, lactate, malonate, citrate, and glycolate. Among the preferred delaying agents are lactate salts, such as ammonium lactate, potassium lactate, or sodium lactate. Of the preferred delaying agents, malonate and citrate have the highest degree of ligand strength and acetate the lowest with glycolate and lactate being of intermediate strength, wherein the delay time is normally a direct function of the ligand strength and concentration of the delaying agent.

For unhydrolyzed PA, crosslinking does not normally occur until the PA has hydrolyzed to a significant degree. Thus, in the absence of a delaying agent, crosslinking of the unhydrolyzed PA is a function of the polymer hydrolysis reaction. If a delaying agent is present, however, crosslinking can be a function of both the polymer hydrolysis reaction and the ligand strength of the delaying agent. Where the delaying agent is a carboxylate ligand, crosslinking is also a function of the molar ratio of the carboxylate anion to transition metal cation for a given carboxylate anion. In particular, the length of the delay time for the crosslinking reaction increases as the molar ratio of carboxylate to transition metal cations increases.

Before crosslinking is completed, the foamed gel is characterized as being immature. Once crosslinking has gone to completion, i.e., when either substantially all of the crosslinking agent or substantially all of the carboxylate crosslinking sites is consumed, the foamed gel is characterized as being mature. The integral components of the resulting mature foamed gel are the gel medium and the added gas dispersed therein. The crosslinked polymer makes up the structural network of the gel medium and the liquid solvent makes up the interstitial liquid of the gel medium.

The physical properties of the foamed gel are a function of the specific foamed gel components and their relative proportions. Values of the above-recited variables are selected to create foamed gels across a wide range of viscosities, structures, stabilities, strengths, and densities as desired. The viscosity of foamed gels can range from highly viscous to viscosities approaching that of water. The character of the gel medium contributes to the structure or viscosity and stability of the foamed gel. In general, the degree of structure or viscosity and stability of a foamed gel containing an acrylamide polymer is increased by increasing the polymer concentration of the liquid phase. Sometimes, a more cost-effective and preferred means for achieving the same effect is to employ a higher molecular weight polymer or, at other times, a polymer having a higher degree of hydrolysis at a relatively fixed polymer concentration. Conversely, a reduction in the degree of structure or viscosity is achieved by using a lower molecular weight polymer or, at other times, one having a lower degree of hydrolysis.

It has also been found that the stability and foamability of the foam is at times a function of the molecular weight and concentration of the polyvinyl alcohol. In general the stability of the foamed gel is enhanced by employing a polyvinyl alcohol having a relatively high molecular weight, e.g., greater than about 50,000. Similarly, the stability of a foam is enhanced by employing a polyvinyl alcohol at a relatively low concentration in the gelation solution, e.g., less than about 12,000. Thus, the skilled practitioner can design the foamed gel in correspondence with the performance requirements of the formation, thereby ensuring the effective performance of the foamed gel as either a permeability-reducing composition or a mobility-controlling composition.

Relative to many conventional oilfield foams, the present foamed gel is significantly more stable over a wide range of temperature and pressure, as well as formation water salinity, hardness and pH. The foamed gel is also stable in the presence of liquid hydrocarbons such as crude oil, resisting collapse and fluid drainage.

Use of the foamed gel in a formation as a permeability-reducing composition or a mobility-controlling composition is performed in accordance with a number of different preparation and injection sequences. In accordance with one sequence, the foamed gel is prepared by premixing a gelation solution at the surface containing all of the foamed gel components exclusive of the added gas. The added gas is then dispersed within the gelation solution under foaming conditions either before, after, or during injection of the gelation solution into the wellbore.

Addition of the gas to the gelation solution before injection of the gelation solution into the wellbore generates a preformed foamed gel at the surface. The preformed foamed gel is subsequently injected into the wellbore and displaced into the formation. If the foamed gel is immature upon displacement into the formation, it is aged to maturity therein. If the foamed gel is mature upon displacement into the formation, no further aging of the foamed gel is required.

Addition of the gas to the gelation solution in situ after injection of the gelation solution into the wellbore generates the foamed gel in situ, rendering displacement of the foamed gel into the formation substantially simultaneous with generation thereof. Thus, for example, the gelation solution and gas can be sequentially injected into the wellbore and the foamed gel generated from the foamed gel components in situ upon or after entering the formation followed by aging of the foamed gel, if required.

Addition of the gas to the gelation solution during injection of the gelation solution into the wellbore is achieved by coinjection of the gas and gelation solution into the wellbore. The foamed gel is either generated in the injection means before the foamed gel enters the formation, or, alternatively, in situ after the foamed gel components enter the formation.

In accordance with an alternate sequence, a foamed gel having the above-described composition is prepared by premixing a polymer-enhanced foam at the surface containing the foamed gel components exclusive of the crosslinking agent. The crosslinking agent is then metered into the polymer-enhanced foam during injection of the foam into the wellbore. The resulting immature foamed gel is then aged to maturity in the wellbore or the formation.

The above-described foamed gel has utility in a process for permeability reduction or in a process for mobility control, depending on the requirements of the formation in which the foamed gel is applied. The design and practice of a process for permeability reduction or mobility control is within the purview of the skilled artisan applying the teaching set forth herein. The permeability reduction process has applications to a number of treatments, including conformance improvement treatments, water or gas shut-off treatments and water or gas coning treatments. Shut-off and coning treatments have particular utility at production well bores. Conformance improvement treatments improve vertical and areal conformance within a subterranean formation and correspondingly improve flow profiles and sweep efficiencies of injected fluids or produced hydrocarbon fluids in the formation, thereby enhancing contact within the formation between injected fluids and produced hydrocarbon fluids to desirably mobilize the hydrocarbon fluids and facilitate their displacement from the formation.

The mobility control process promotes improved sweep efficiency and incremental oil recovery of a gas or liquid drive fluid in a hydrocarbon-bearing formation. The mobility control process is practiced by injecting the mobility-controlling composition into the formation in a flowing state ahead of, interspersed with, or behind the drive fluid. The mobility-controlling composition can also be injected into the formation via repeated sequential injection in accordance with any number of sequences incorporating the drive fluid.

Although the present invention is described as a permeability reduction process "or" as a mobility control process, it is understood that the term "or" encompasses practicing the two processes simultaneously within the same formation using essentially the same foamed gel composition, as well as practicing either of the two processes by itself as a separate and distinct process within the formation exclusive of the other process. The following examples demonstrate the practice and utility of the present invention, but are not to be construed as limiting the scope thereof.

EXAMPLES

A number of foamed gel samples are individually prepared in sample bottles in accordance with the present invention. The sample bottles are 0.2 liter, cylindrical, wide-mouth, glass bottles having an inside diameter of 4.5 cm. The samples are initiated by formulating gelation solutions comprising PHPA, chromic trichloride, polyvinyl alcohol (PVA) and tap water. The gelation solutions are sparged with a gas to form the foamed gel samples. One or more of the foamed gel parameters are varied between each sample for purposes of comparison. In all cases, however, the PHPA is the same composition having a molecular weight of about 11,000,000 and 2 mole % hydrolysis. The pH of the foamed gel is also maintained slightly basic in all cases at about 8, adding a chemical pH adjuster if required to maintain the pH level. Unless otherwise noted the gas is nitrogen.

The foamed gel samples are observed in the sample bottles throughout an aging time and characterized in accordance with the code set forth below. The results of the observations are reported in Examples 1–6. Unless otherwise noted concentration (conc) is reported in parts per million (ppm), time is reported in hours (hr) and aging is performed at room temperature.

Code for Characteristics of Foamed Gels

A No detectable gel formation. Same viscosity as initial uncrosslinked polymer solution.

B High flowing foamed gel. Slightly more viscous than initial uncrosslinked polymer solution.
C Flowing foamed gel. Most of foamed gel flows to bottom of sample jar upon inversion.
D Moderately flowing foamed gel. Small portion of foamed gel does not readily flow to bottom of sample jar upon inversion.
E Barely flowing foamed gel. Foamed gel slowly flows to bottom of sample jar upon inversion or a significant portion does not flow to bottom upon inversion.
F Highly deformable nonflowing gel. Foamed gel flows to just short of bottom of sample jar upon inversion.
G Moderately deformable nonflowing foamed gel. Foamed gel flows halfway to bottom of sample jar upon inversion.
H Slightly deformable nonflowing foamed gel. Foamed gel surface only slightly deforms upon inversion of sample jar.
I Rigid foamed gel. No surface deformation of foamed gel upon inversion of sample jar.

* "+" or "−" denote shades of foamed gel strength at a given code level.

Example 1

| Run No. | 1 | 2 | 3 | 4 | 5 |
|---|---|---|---|---|---|
| polymer conc: | 5000 | 5000 | 5000 | 2500 | 2500 |
| cation conc: | 164 | 164 | 164 | 41 | 41 |
| PVA MW: | 49,000 | 96,000 | 125,000 | 96,000 | 125,000 |
| PVA conc: | 5000 | 5000 | 6700 | 5000 | 5000 |

| Foamed Gel Code | | | | | |
|---|---|---|---|---|---|
| Time: | | | | | |
| 0 | A | A | A | A | A |
| 24 | H | H | H | D | D |
| 48 | H | H | H | D | D |
| 72 | H | H | H | D | D |
| 150 | H | H | H | D | D |

| Run No. | 6 | 7 |
|---|---|---|
| polymer conc: | 5000 | 2500 |
| cation conc: | 164 | 41 |
| PVA MW: | 125,000 | 125,000 |
| PVA conc: | 5000 | 4000 |

| Foamed Gel Code | | |
|---|---|---|
| Time: | | |
| 0 | A | A |
| 24 | H | D |
| 48 | H | D |
| 72 | H | D |
| 150 | H | D+ |

The results of Example 1 show that foamed gel strength increases with sing polymer concentration and that foamed gels can be formed with a wide of PVA molecular weights.

Example 2

Example 2 is performed in a similar manner to Example 1 except that dehyde (37% active) is added to the gelation solutions of Example 2 as a at a final active concentration of 1000 ppm.

| Run No. | 1 | 2 | 3 | 4 | 5 | 6 |
|---|---|---|---|---|---|---|
| polymer conc: | 5000 | 5000 | 5000 | 2500 | 2500 | 2500 |
| cation conc: | 164 | 164 | 164 | 41 | 41 | 41 |
| PVA MW: | 49,000 | 96,000 | 125,000 | 96,000 | 125,000 | 125,000 |
| PVA conc: | 5000 | 5000 | 6700 | 5000 | 10,000 | 5000 |

| Foamed Gel Code | | | | | | |
|---|---|---|---|---|---|---|
| Time: | | | | | | |
| 0 | A | A | A | A | A | A |
| 24 | H | H | H | H | H | H |
| 48 | H | H | H | H | H | H |
| 72 | H | H | H | H | H | H |
| 150 | H | H | H | H | H | H |

The results of Example 2 show that the use of formaldehyde in the foamed gel as a biocide does not interfere with foamed gel formation and that foamed gels can be formed with a wide range of PVA concentrations.

Example 3

Example 3 is performed in a similar manner to Example 1 except that formaldehyde (37% active) is added to the gelation solutions of Example 3 as a biocide at a final active concentration of 1000 ppm. Example 3 is also performed at temperatures exceeding room temperature.

| Run No. | 1 | 2 | 3 | 4 |
|---|---|---|---|---|
| temp (°C.) | 51 | 59 | 64 | 67 |
| polymer conc: | 5000 | 5000 | 2500 | 2500 |
| cation conc: | 164 | 82 | 41 | 82 |
| PVA MW: | 125,000 | 125,000 | 125,000 | 125,000 |
| PVA conc: | 5000 | 2900 | 4000 | 2900 |

| Foamed Gel Code | | | | |
|---|---|---|---|---|
| Time: | | | | |
| 0 | A | A | A | A |
| 24 | H | H | D | D |
| 48 | H | H | E | E |
| 72 | H | H | E | E |
| 150 | H | H | E | E |

The results of Example 3 show that foamed gels can be formed across a wide range of temperatures.

Example 4

Example 4 is performed in a similar manner to Example 1 except that the gelation solutions of Example 4 are sparged with ambient air rather than nitrogen.

| Run No. | 1 | 2 | 3 | 4 |
|---|---|---|---|---|
| polymer conc: | 2500 | 5000 | 2500 | 2500 |
| cation conc: | 41 | 82 | 82 | 82 |
| PVA MW: | 125,000 | 125,000 | 125,000 | 125,000 |
| PVA conc: | 10,000 | 2900 | 4000 | 2900 |

| Foamed Gel Code | | | | |
|---|---|---|---|---|
| Time: | | | | |
| 0 | A | A | A | A |
| 1 | D | G | D | D |
| 24 | G | H | D | D |

-continued

| | | | | |
|---|---|---|---|---|
| 96 | H | H | E | E |
| 150 | H | H | E | E |

Example 5

Example 5 is performed in a similar manner to Example 1 except that formaldehyde (37% active) is added to the gelation solutions of Example 5 as a biocide at a final active concentration of 1000 ppm. The gelation solutions of Example 5 are also sparged with ambient air rather than nitrogen.

| Run No. | 1 | 2 | 3 | 4 |
|---|---|---|---|---|
| polymer conc: | 5000 | 2500 | 2500 | 2500 |
| cation conc: | 82 | 41 | 82 | 82 |
| PVA MW: | 125,000 | 125,000 | 125,000 | 125,000 |
| PVA conc: | 10,000 | 2900 | 4000 | 2900 |
| Foamed Gel Code | | | | |
| Time: | | | | |
| 0 | A | A | A | A |
| 1 | D | G | D | D |
| 24 | D | H | D | D |
| 96 | E | H | E | E |
| 150 | E | H | E | E |

Example 6

As a control experiment, Example 6 is performed in a similar manner to Example 1 except that PVA is omitted from the gelation solutions of Example 6.

| Run No. | 1 | 2 | 3 | 4 | 5 | 6 |
|---|---|---|---|---|---|---|
| polymer conc: | 10,000 | 5000 | 2500 | 10,000 | 5000 | 2500 |
| cation conc: | 164 | 82 | 41 | 164 | 82 | 41 |

The results of Example 6 show that no foaming of the produced gels occurs in the absence of PVA, indicating that PVA is an essential functional component in the foamed gels of the present invention.

Example 7

As a control experiment, PVA solutions are prepared in the sample bottles, omitting all other gelation solution components. The PVA solutions are sparged with nitrogen and the resulting foam samples are aged and characterized in accordance with the code set forth below. The results of the observations are reported below and unless otherwise noted aging is performed at room temperature and time is reported in hours (hr).

Code for Characteristics of Foams

A—no foam formed
B—foam bubbles only appear near surface of the solution
C—foam bubbles only appear throughout top half of the solution
D—foam bubbles appear throughout the entire solution, but no significant height increase in level of solution
E—entire solution foamed, small increase in level of solution ($\leq 2.5$ cm)
F—entire solution foamed, foam fills half of sample jar
G—entire solution foamed, foam fills entire sample jar
* "+" or "–" denote shades of foaming at a given code level.

| Run No. | 1 | 2 | 3 | 4 | 5 | 6 |
|---|---|---|---|---|---|---|
| PVA MW: | 96,000 | 96,000 | 96,000 | 125,000 | 125,000 | 125,000 |
| PVA conc: | 20,000 | 13,300 | 10,000 | 20,000 | 13,300 | 10,000 |
| Foam Code | | | | | | |
| Time: | | | | | | |
| 0 | G | G | G | G | G | G |
| 10 min. | F– | F– | F– | F | F | F |
| 20 min. | B | B | B | F | F– | E+ |
| 30 min. | A | B– | B– | F | E+ | E |
| 40 min. | A | A | A | F– | E | E |
| 50 min. | A | A | A | F– | E– | E– |
| 1 | | | | F– | E– | E– |
| 1.5 | | | | E+ | B+ | B+ |
| 2 | | | | E | B | B |
| 2.5 | | | | E | B | B |
| 3 | | | | E– | B | B |
| 3.5 | | | | B+ | B– | B– |
| 4 | | | | B+ | B– | B– |
| 4.5 | | | | B | A | A |
| 5 | | | | A | A | A |

The results of Example 7 show that no usable foamed gel is produced in the absence of PHPA and chromic trichloride.

In summary, it is apparent from Examples 1–5 that stable foamed gels are produced in accordance with the present invention. Example 6, as compared to Examples 1–5, demonstrates that PVA possesses surfactant-like properties that are required to produce the foamed gels of the present invention. Example 7 demonstrates that a suitable crosslinkable polymer and crosslinking agent are likewise required to produce the foamed gels of the present invention.

While the foregoing preferred embodiments of the invention have been described and shown, it is understood that alternatives and modifications, such as those suggested and others, may be made thereto and fall within the scope of the present invention.

I claim:

1. A process for reducing the permeability of a treatment region in a subterranean hydrocarbon-bearing formation comprising:
   placing a foamed gel in a treatment region of a subterranean hydrocarbon-bearing formation to substantially reduce the permeability of said treatment region, wherein said foamed gel is formed from an added gas and a gelation solution including an acrylamide-containing crosslinkable carboxylate-containing polymer, a crosslinking agent containing a reactive transition metal cation, a foam promoting composition consisting of a single chemical species, and an aqueous solvent, wherein said single chemical species of said foam promoting composition is a polyvinyl alcohol and said polyvinyl alcohol has a concentration in said gelation solution from about 20 ppm to about 100,000 ppm and has an average molecular weight from about 1,000 to about 500,000.

2. The process of claim 1 wherein said foamed gel is prepared by contacting said gelation solution with said added gas, and substantially crosslinking said polymer with said crosslinking agent.

3. The process of claim 2 wherein said gelation solution and added gas are contacted at the surface and thereafter injected into a wellbore in fluid communication with said formation.

4. The process of claim 2 wherein said gelation solution and added gas are contacted at the surface by coinjection into a wellbore in fluid communication with said formation.

5. The process of claim 2 wherein said gelation solution and added gas are contacted in said formation.

6. The process of claim 1 wherein said acrylamide-containing polymer is selected from a group consisting of polyacrylamide, partially hydrolyzed polyacrylamide, and copolymers, terpolymers and tetrapolymers of acrylamide.

7. The process of claim 1 wherein said reactive transition metal cation is trivalent chromium.

8. The process of claim 1 wherein said crosslinking agent is an organic salt of trivalent chromium.

9. The process of claim 1 wherein said crosslinking agent is a complex including trivalent chromium and one or more anionic carboxylate ligands.

10. The process of claim 9 wherein said one or more anionic carboxylate ligands is acetate.

11. The process of claim 1 wherein said gelation solution further includes a biocide.

12. The process of claim 1 wherein said gelation solution further includes a delaying agent.

13. A process for controlling the mobility of a drive fluid in a subterranean hydrocarbon-bearing formation comprising:

placing a foamed gel in a subterranean hydrocarbon-bearing formation in association with a drive fluid to control the mobility of said drive fluid in said formation, wherein said foamed gel is formed from an added gas and a gelation solution including an acrylamide-containing crosslinkable carboxylate-containing polymer, a crosslinking agent containing a reactive transition metal cation, a foam promoting composition consisting of a single chemical species, and an aqueous solvent, wherein said single chemical species of said foam promoting composition is a polyvinyl alcohol and said polyvinyl alcohol has a concentration in said gelation solution from about 20 ppm to about 100,000 ppm and has an average molecular weight from about 1,000 to about 500,000.

14. The process of claim 13 wherein said foamed gel is prepared by contacting said gelation solution with said added gas, and substantially crosslinking said polymer with said crosslinking agent.

15. The process of claim 14 wherein said gelation solution and added gas are contacted at the surface and thereafter injected into a wellbore in fluid communication with said formation.

16. The process of claim 14 wherein said gelation solution and added gas are contacted at the surface by coinjection into a wellbore in fluid communication with said formation.

17. The process of claim 14 wherein said gelation solution and added gas are contacted in said formation.

18. The process of claim 13 wherein said acrylamide-containing polymer is selected from a group consisting of polyacrylamide, partially hydrolyzed polyacrylamide, and copolymers, terpolymers and tetrapolymers of acrylamide.

19. The process of claim 13 wherein said reactive transition metal cation is trivalent chromium.

20. The process of claim 13 wherein said crosslinking agent is an organic salt of trivalent chromium.

21. The process of claim 13 wherein said crosslinking agent is a complex including trivalent chromium and one or more anionic carboxylate ligands.

22. The process of claim 21 wherein said one or more anionic carboxylate ligands is acetate.

23. The process of claim 13 wherein said gelation solution further includes a biocide.

24. The process of claim 13 wherein said gelation solution further includes a delaying agent.

* * * * *

UNITED STATES PATENT AND TRADEMARK OFFICE
CERTIFICATE OF CORRECTION

PATENT NO.    : 5,834,406
DATED         : November 10, 1998
INVENTOR(S)   : Robert D. Sydansk It is certified that error appears in the above-indentified patent and that said Letters Patent is hereby corrected as shown below:

Col. 9, line 58   : Delete "sing" and insert --increasing--.
Col. 9, line 59   : Following "wide" insert --range--.
Col. 9, line 65   : Following "that" delete "dehyde" and insert --formaldehyde--.
Col. 9, line 66   : Following "a" at the first occurrence insert --biocide--.
Col. 11, line 66  : Delete "≤" and insert --<--.

Signed and Sealed this

Twentieth Day of July, 1999

Attest:

Q. TODD DICKINSON

Attesting Officer

Acting Commissioner of Patents and Trademarks